Sept. 13, 1932.  A. HÉRAULT  1,877,725
DEVICE FOR PROJECTING COLOR AND MONOCHROME FILMS
Filed May 4, 1929   2 Sheets-Sheet 1

INVENTOR:
Albert Hérault
By Marion & Marion
Attorneys.

Sept. 13, 1932.  A. HÉRAULT  1,877,725
DEVICE FOR PROJECTING COLOR AND MONOCHROME FILMS
Filed May 4, 1929   2 Sheets-Sheet 2
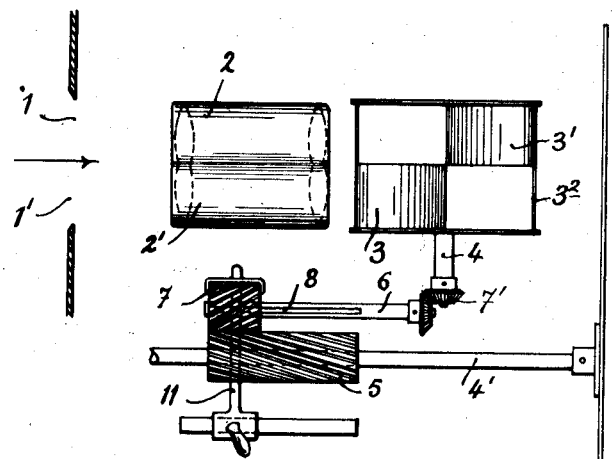
Fig. 3.
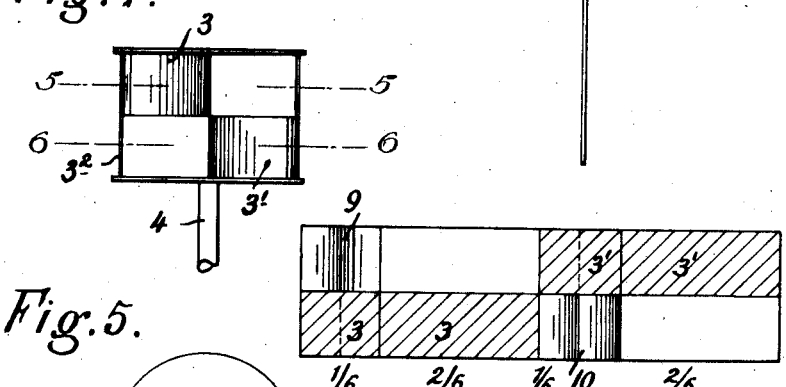
Fig. 4.
Fig. 5.
Fig. 7.
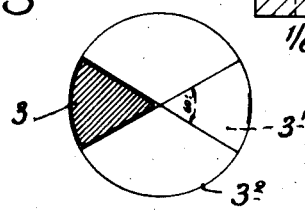
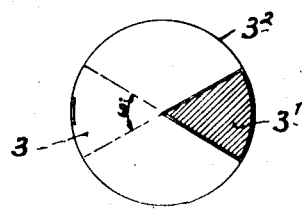
Fig. 6.
INVENTOR.
Albert Hérault
By Maxim & Maxim
Attorneys.

Patented Sept. 13, 1932

1,877,725

UNITED STATES PATENT OFFICE

ALBERT HÉRAULT, OF PARIS, FRANCE

DEVICE FOR PROJECTING COLOR AND MONOCHROME FILMS

Application filed May 4, 1929. Serial No. 360,462.

This invention relates to the projection of cinematograph films.

It is a well-known fact that in the projection of multi-color films, (for instance three-color films) a very pronounced and disturbing scintillation effect is produced on the projection screen, which disappears however if the pictures are projected in such a manner as to produce approximately 60 picture changes per second, as compared with the usual 30 picture changes per second, and the present invention has in view to provide means adapted to work in co-operation with the usual double-bladed shutter which will ensure such frequency of picture changes whilst the film is fed at a normal speed of approximately 30 pictures per second.

For the projection of black-and-white films, on the other hand the best results are obtained when there are only 30 picture changes per second and the present invention provides for reverting in a simple manner to such normal frequency of picture changes when it is desired to project black-and-white films. In practice, of course, with this latter arrangement, there are really 60 projections due to the fact that each picture is interrupted during its display and therefore forms the subject of two consecutive projections but such interruption does not, of course, constitute a "picture-change", and is in fact the well-known usual arrangement.

When, however, color films are projected according to my invention, although each picture is still exhibited twice, its two projections are not consecutive, the order of projection of the pictures being so varied that by the time any particular picture in question is exhibited a second time, a different picture has already been shown since it was previously exhibited so that in considering the number of pictures shown in a given time, say one second, each picture in its second exhibition must be regarded as a fresh picture and in this sense therefore it will be apparent that double the number of picture changes take place as compared with normal projection.

My invention provides for altering from one frequency of picture changes, to the other said frequency without the necessity for temporarily discontinuing the projection in the case where a film being shown has a combination of black-and-white and multi-color pictures.

According to this invention projection takes place through a window or opening which has a vertical dimension such as to frame two adjacent pictures of the film and there is provided a double lens member, the two lens units of which are aligned with the respective pictures framed by the window. Means is provided operating in conjunction and synchronized with the usual shutter for effecting alternate projection through the said two lens units.

In order that the said invention may be more readily understood reference is directed to the following description to be read in conjunction with the accompanying sheets of drawings in which latter:—

Figure 3 is a side view of the apparatus.

Figure 1:
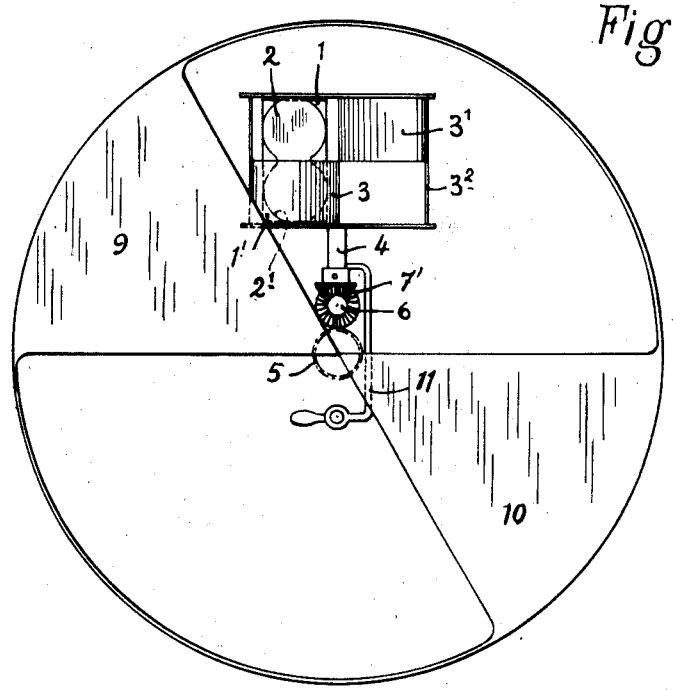
Figure 1 is a front view of the apparatus including the main shutter.

Figure 4 is a side view of an auxiliary shutter which forms part of such apparatus, and Figures 5 and 6 are sections on lines 5—5 and 6—6 respectively of Figure 4.

Figure 7 is a diagram indicating the timing of the cutting off by the main and auxiliary shutters during a single revolution of the main shutter, when the auxiliary shutter is set for color-film projection.

Referring to the drawings there is provided a window 1 and $1^1$ having twice the height of the usual window so as to frame two adjacent pictures of the film, and a double lens is positioned in front of said window, having its two lens units 2 and $2^1$ aligned with the respective pictures framed by the window. Between the said double lens and the ordinary lens with which every projecting device is provided, is fitted an auxiliary shutter consisting of two opposed opaque prisms or sectors 3 and $3^1$ occupying different planes aligned with the respective lens units, the apices of said sectors being coincident and located at the axis of revolution, which is vertical.

These sectors subtend an angle of 60°. They consist each of a body made of any suitable opaque material, mounted in a suitable frame $3^2$. The overall width of each sector is greater than the greatest horizontal dimension of a picture, and the height thereof must be at least equal to the height of the picture.

The plane formed by the bottom base of the upper prism and the upper base of the lower prism is the continuation of the plane which passes through the line of separation of the two pictures which are framed in the window.

Figure 2:
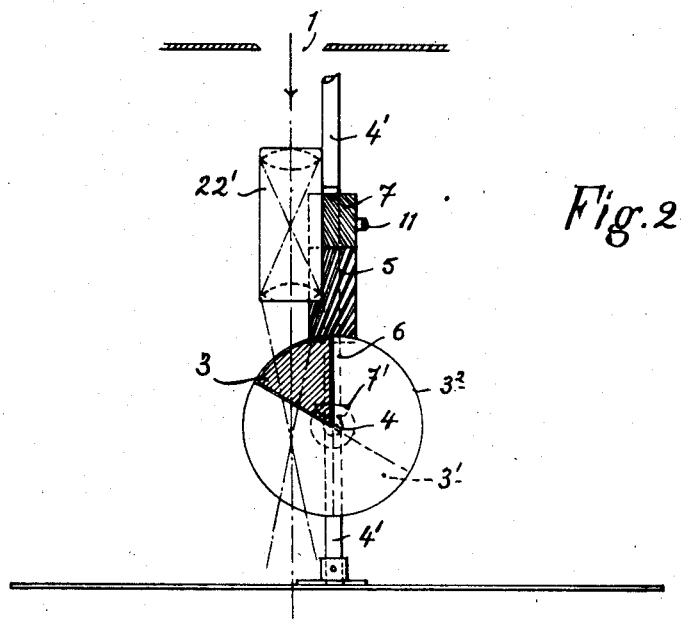
Figure 2 is a plan view of such apparatus.

The axis of rotation 4 must be situated just outside the projected beam of rays, as shown by Figure 2. On the axle $4^1$ of the ordinary double-blade shutter of a cinematograph projection apparatus is fitted a helical pinion 5 having a certain pitch. On an additional axle 6, which is fitted parallel to axle 4, is secured a helical pinion 7 having the same pitch as pinion 5, with which it meshes, although it is shorter, and possesses freedom to move along its axle 6, whilst remaining in mesh with pinion 5 and continuing to drive the axle 6 through the medium of a long key 8 (see Figure 3). This additional axle 6 thus may be varied as to rotational position with respect to axle 4' and it drives the auxiliary shutter through the medium of bevel gears $7^1$. The aforesaid variation of relative positions of axles $4^1$ and 6 is such as to ensure a variation of one half revolution of the auxiliary shutter in relation to the main shutter.

It will be easily realized that, as shown in Figure 7, during the ⅙th period of cut-off by the shutter blade 9 of the ordinary shutter, which subtends an angle of 60, the auxiliary shutter will perform a similar angular displacement within a perpendicular plane, and for color-film projection the auxiliary shutter is set so that the part 3 thereof will continue to shut off the light by way of the lower lens unit $2^1$ during the following ⅔ths of its revolution. The other blade 10 of the main shutter then further prolongs the period of cut-off by way of the lower lens unit since the main shutter has now performed a half revolution, but immediately the main-shutter blade 10 has passed, projection will take place by way of the lower lens unit since the sector 3 is not out of register with the light beam passing therethrough, and such projection will continue until again cut off by the blade 9. The action is identical with regard to projection through the upper lens unit, which projection however takes place in interval between the passing of blades 9 and 10 but not in the interval between the passing of blades 10 and 9. Thus projection takes place alternately by way of the upper and lower lens units.

The film movement (which in the case of both picture-change frequencies occurs during the period of cut-off by the shutter blade 9) therefore occurs after projection by the lower lens $2^1$ and before projection by the upper lens 2.

Consequently in the setting of the auxiliary shutter for color-film projection, during the period that the pictures within the window remain stationary the upper image will be projected during the period of time passing between the shutting off by blade 9, and shutting off by blade 10, and the lower image will be shown during the period of time passing between shutting off by blade 10 and shutting off by blade 9, without any additional time being added to the period of darkness (see Figure 7). The latter fact will be appreciated when it is realized that with normal projection each picture is interrupted during its projection by the compensating shutter blade, as is well-known.

The film, as usual, is adapted to travel in a downward direction and with the auxiliary shutter set as above, the result obtained is a picture-change not only when the shutter blade 9 passes but also when the blade 10 passes; that is to say a following picture is exhibited (during a one-half revolution of the main shutter) in the time interval between the two showings of any picture considered and therefore if the images are numbered in the order of a normal projection (or order of the taking of the views)—1, 2, 3, 4, 5, 6, 7, 8, 9 and so on, these images will be projected in the order:—2—1, 3—2, 4—3, 5—4, 6—5, 7—6, 8—7, 9—8 and so on, the image which is the last to appear in the double window being always projected first. Each image is therefore projected twice (since the film is fed image after image), the frequency of picture-change is therefore doubled, and it is thus possible, at a film-speed of 30 pictures per second, to obtain 60 projections alternated in the order necessary to obtain on the screen a combination of colors without scintillation.

Since the auxiliary shutter is fitted externally of the projector and as its direction of revolution is horizontal, it can be fitted on all projection devices, whatever their construction. The only condition required for use thereof is that it must remain in correct position in relation to the double lens 2 and $2^1$. If the composite lens is displaced the auxiliary shutter must be displaced to the same extent.

This device is perfectly suitable for the conditions in which two-color, anaglyphic, and stereoscopic films are projected.

As hereinbefore explained, the best result in connection with black-and-white films, is obtained, when the picture-change frequency is only 30 picture-changes per second.

If the auxiliary shutter 3, 3¹ instead of being set to give the foregoing results, is turned through 180 degrees about its axis, with respect to the main shutter, it will be seen that the picture-change (still occuring during the cut-off by the shutter blade 9) will take place in the interval after projection by the upper lens 2 and before projection by the lower lens 2¹, (as distinct from the above described arrangement where it was changed after projection by the lower lens 2¹ and before projection by the upper lens 2) and the consequence is that the picture just shown by way of the upper lens 2 will, after the film movement, be immediately shown again in its new position by way of the lower lens 2¹. In this manner the pictures consecutively numbered 1, 2, 3, 4, 5, 6 and so on, will be shown in the order 1, 1—2, 2—3, 3—4, 4—5, 5—6 and so on, which amounts to two consecutive showings of each picture which is precisely what occurs with ordinary projection and thus there are only 30 picture-changes per second.

The aforesaid rotational movement of the auxiliary shutter with respect to the main shutter is carried out in practice, by advancing the pinion 7 along its axis whilst it remains in mesh with the pinion 5. The latter having no such sliding movement, however, the result is a one-half rotation of said pinion 7 with respect to the pinion 5, such half-rotation being conveyed to the auxiliary shutter by way of the bevel pinions 7'. In this manner the aforesaid desired alteration of the picture-change frequency can be carried out whilst the film is being shown if so desired.

What I claim is:—

1. In an apparatus for projection of colored and black and white images, a window of a height double of the normal one, two superposed objectives, two superposed prisms, opaque, placed aside and oppositely to each other with their summits forming angle of sixty degrees, an ordinary, two-winged obturator, a helicoidal pinion on its shaft, a shorter helicoidal pinion on a supplementary shaft parallel to the shaft of the obturator, and longitudinally displaceable on this shaft, and means to transmit the motion from said supplementary shaft to said prismatic system, substantially as described.

2. In an alternating inversing reversible prismatic device for projecting color films, means for projecting the film in black and white by inversing the alternations particular to the color, a differential drive comprising a drive pinion secured to the ordinary shutter axle of a projector, an auxiliary independent shaft parallel with and co-operating with the first axle, and a pinion shiftable longitudinally on said parallel shaft and meshing with the drive pinion, whereby the shift of the driven pinion on the drive pinion decreases the pitch of the drive pinion of a value equal to that of the shift so that the parallel shaft may vary of a half turn relative to the shutter axle.

In witness whereof I have hereunto set my hand.

ALBERT HÉRAULT.